United States Patent
Liu et al.

(10) Patent No.: US 10,639,618 B2
(45) Date of Patent: May 5, 2020

(54) WAX OIL HYDROCRACKING METHOD AND SYSTEM

(71) Applicants: China Petroleum & Chemical Corporation, Beijing (CN); Dalian Research Institute of Petroleum and Petrochemicals, SINOPEC CORP., Dalian, Liaoning (CN)

(72) Inventors: Tao Liu, Liaoning (CN); Baozhong Li, Liaoning (CN); Ronghui Zeng, Liaoning (CN); Yuzhuo Zhao, Liaoning (CN); Zhenmin Bai, Liaoning (CN); Xiangchen Fang, Liaoning (CN); Yan Wang, Liaoning (CN); Xuehui Zhang, Liaoning (CN); Chang Liu, Liaoning (CN)

(73) Assignees: China Petroleum & Chemical Corporation, Beijing (CN); Dalian Research Institute of Petroleum and Petrochemicals, SINOPEC CORP., Dalian, Liaoning (CN)

( * ) Notice: Subject to any disclaimer, the term of this patent is extended or adjusted under 35 U.S.C. 154(b) by 0 days.

(21) Appl. No.: 16/235,932

(22) Filed: Dec. 28, 2018

(65) Prior Publication Data
US 2019/0201882 A1     Jul. 4, 2019

(30) Foreign Application Priority Data

Dec. 29, 2017  (CN) .......................... 2017 1 1468916
Dec. 29, 2017  (CN) .......................... 2017 1 1469415

(51) Int. Cl.
C10G 47/26     (2006.01)
B01J 29/70     (2006.01)
(Continued)

(52) U.S. Cl.
CPC .......... *B01J 29/7007* (2013.01); *B01J 29/80* (2013.01); *C10G 65/00* (2013.01); *C10G 65/12* (2013.01); *C10G 65/14* (2013.01); *B01J 2229/36* (2013.01)

(58) Field of Classification Search
CPC .... B01J 2229/36; B01J 29/7007; B01J 29/80; B01J 2229/26; B01J 2229/42;
(Continued)

(56) References Cited

U.S. PATENT DOCUMENTS 4,837,396 A     6/1989  Herbst et al.
5,993,644 A *  11/1999  Xiao .................... C10G 65/043
                                                                 208/89
(Continued)

FOREIGN PATENT DOCUMENTS

CN     1293228 A     5/2001
CN     1508225 A     6/2004
(Continued)

*Primary Examiner* — Sharon Pregler
(74) *Attorney, Agent, or Firm* — Novick, Kim & Lee, PLLC; Allen Xue

(57) ABSTRACT

A method of wax oil hydrocracking includes the steps of pre-hydrotreating wax oil to obtain a pre-hydrotreated material flow; controlling the pre-hydrotreated material flow and a hydrogen-containing material flow to contact with a first hydrocracking catalyst to obtain a first hydrocracked material flow, and dividing the first hydrocracked material flow into a first hydrocracked material flow A and a first hydrocracked material flow B; controlling the flow B and a hydrogen-containing material flow to contact with a second hydrocracking catalyst to obtain a second hydrocracked material flow, and then separating and fractionating the second hydrocracked material flow to obtain a hydrocracked tail oil product; controlling the flow A, at least a part of the hydrocracked tail oil product, and a hydrogen-containing material flow to contact with a hydrogenation isocracking (Continued)

catalyst to obtain a hydrogenation isocracked material flow, and then separating and fractionating the obtained hydrogenation isocracked material flow.

20 Claims, 2 Drawing Sheets

(51) Int. Cl.
*B01J 29/80* (2006.01)
*C10G 65/14* (2006.01)
*C10G 65/12* (2006.01)
*C10G 65/00* (2006.01)

(58) Field of Classification Search
CPC ..... B01J 29/084; B01J 29/7057; C10G 65/12; C10G 2300/1077; C10G 47/26; C10G 67/02; C10G 2300/1074; C10G 2300/4081; C10G 2400/04; C10G 2400/08; C10G 65/10; C10G 2400/10; C10G 11/05; C10G 11/18; C10G 11/182; C10G 11/187; C10G 2300/104; C10G 2300/1044; C10G 2300/107; C10G 2300/1088; C10G 2300/301; C10G 2300/302

See application file for complete search history.

(56) References Cited

U.S. PATENT DOCUMENTS

| | | | |
|---|---|---|---|
| 9,605,218 | B2 | 3/2017 | Smiley et al. |
| 9,809,764 | B2 | 11/2017 | Umansky et al. |
| 2018/0273860 | A1* | 9/2018 | Schleiffer .............. C10G 47/26 |

FOREIGN PATENT DOCUMENTS

| | | |
|---|---|---|
| CN | 116919 C | 10/2004 |
| CN | 103394368 A | 11/2013 |
| CN | 103055922 B | 5/2015 |
| CN | 103551186 B | 7/2015 |
| CN | 105582992 A | 5/2016 |
| CN | 104611020 A | 8/2016 |
| CN | 105018139 B | 10/2016 |
| EA | 019522 B1 | 4/2014 |
| EA | 026212 B1 | 3/2017 |
| WO | 2016071776 A2 | 5/2016 |
| WO | 2016127840 A1 | 8/2016 |

* cited by examiner

WAX OIL HYDROCRACKING METHOD AND SYSTEM

CROSS REFERENCE TO RELATED APPLICATIONS

This application claims priority to Chinese Application No. 201711469415.3, filed on Dec. 29, 2017, entitled "Flexible Hydrocracking Process for Wax Oil" and Chinese Application No. 201711468916.X, filed on Dec. 29, 2017, entitled "Flexible Hydrocracking Process for Wax Oil", which are specifically and entirely incorporated by reference.

FIELD OF THE INVENTION

The present invention relates to the petroleum refining field, particularly to wax oil hydrocracking method and system.

BACKGROUND OF THE INVENTION

Hydrogenation techniques are an important means for heavy oil lightening and light oil quality upgrading. Hydrocracking techniques have been developed rapidly because of their advantages such as high adaptability to feedstocks, high product flexibility, high yield of liquid products, and high product quality. Hydrocracking techniques use two types of catalysts, i.e., hydrocracking pretreatment catalysts and hydrocracking catalysts, wherein, hydrocracking catalysts can be categorized into different types of catalysts according to the use of different cracking components. Main cracking components include amorphous silica-alumina, Y zeolites, beta zeolites, SAPO zeolites, and ZSM-5 zeolites, etc. When different types of hydrocracking components are used, the compositions and properties of obtained light oil products are also quite different, and the compositions and properties of the tail oils are also quite different.

The patent document CN103055922B has disclosed a method for preparing a bulk-phase hydrocracking catalyst. The patent documents CN105018139B, CN1293228A, CN1508225A, and CN104611020B have disclosed a hydrocracking method for producing high-quality chemical raw materials at a high yield ratio with low energy consumption, which using two different Y zeolites blended together. Such techniques can use wax oil as feedstock to produce high quality products with a hydrocracking method that uses a hydrocracking catalyst that contain a Y zeolite, wherein, the tail oil has high alkane content and low BMCI value, and is a high-quality raw material for producing ethylene by steam cracking, but each fraction product obtained through hydrocracking is available only in one specification.

The patent document CN105582992A has disclosed a hydro-isomerizing catalyst, a preparation method and an application of the hydro-isomerizing catalyst, and a hydro-isomerizing method for hydrocracked tail oil. Such a technique can use wax oil as feedstock to produce high-quality products with a hydrocracking method that uses a hydrocracking catalyst that contains an isomerizing zeolite, wherein, the tail oil is highly isomerized, has a low solidifying point and a high viscosity index, and is a raw material for high-quality lubricant base oil, but each fraction product obtained through hydrocracking is available only in one specification.

The patent document CN103394368B has disclosed a light oil type hydrocracking catalyst that contains a composite zeolite, and a preparation method and an application of the light oil type hydrocracking catalyst. The patent document CN103551186B has disclosed a middle oil type hydrocracking catalyst that contains a composite zeolite, and a preparation method and an application of the middle oil type hydrocracking catalyst. The patent document U.S. Pat. No. 4,837,396A has disclosed a preparation method of a composite zeolite catalyst. Such techniques can use wax oil as feedstock to produce a variety of high-quality hydrocracked products with a hydrocracking method that uses a composite zeolite hydrocracking catalyst that contains a Y zeolite and an isomerizing zeolite, but each fraction product is available only in one specification.

The patent document CN1169919C has disclosed a method for increasing the yield of high-quality diesel oil with distillate oil. Such a technique can use wax oil as feedstock to produce a variety of high-quality hydrocracked products with a hydrocracking method that uses a hydrocracking catalyst that contains a Y zeolite and a hydrocracking catalyst that contains an isomerizing zeolite at the same time, but each fraction product is available only in one specification.

In summary, it is seen from the comparison of existing hydrocracking techniques that use two different types of zeolite catalysts: among the products obtained with a hydrocracking technique that uses a Y zeolite hydrocracking catalyst, the heavy naphtha product has low sulfur content and relatively high aromatic potential, the jet fuel product has a relatively high smoke point, the diesel oil product has low sulfur content and a high cetane number but a relatively high solidifying point, the tail oil product has low content of aromatic hydrocarbons, relatively low density, a relatively low BMCI value but an extremely high solidifying point usually higher than 30° C.; among the products obtained with a hydrocracking technique that uses an isomerizing zeolite hydrocracking catalyst, the heavy naphtha product has low sulfur content and relatively low aromatic potential content, the diesel oil product has low sulfur content and a low solidifying point but relatively low cetane number, the tail oil has relatively high density but high isomeric hydrocarbon content, and an extremely low solidifying point usually lower than 0° C.; among the products obtained with a hydrocracking technique that uses a Y-isomerizing composite zeolite catalyst or a hydrocracking technique that uses a hydrocracking catalyst that contains a Y zeolite and a hydrocracking catalyst that contains an isomerizing zeolite, the properties of the tail oil are between the properties of the tail oil obtained with a Y zeolite hydrocracking catalyst and the properties of the tail oil obtained with an isomerizing zeolite hydrocracking catalyst. The tail oil products produced with the above-mentioned hydrocracking techniques at the same conversion ratio are quite different from each other, wherein, the tail oil produced with a Y zeolite catalyst is a high-quality raw material for producing ethylene by steam cracking; the tail oil produced with an isomerizing zeolite catalyst can be used directly to produce high-quality lubricant base oil or used as a raw material for high-quality lubricant base oil; the tail oil produced with a Y-isomerizing composite zeolite catalyst or with a Y zeolite hydrocracking catalyst and an isomerizing zeolite hydrocracking catalyst blended together can be used as a raw material for producing ethylene by steam cracking or as a raw material for high-quality lubricant base oil. Therefore, when the above-mentioned hydrocracking processes are used separately, different types of hydrocracking catalysts can be selected as required, or two types of zeolite composite catalysts can be used, or two types of hydrocracking catalysts blended together can be used, but those processes can only produce tail oil products with specific properties depending on the specific process, i.e., the flexibility of operation is relatively poor.

SUMMARY OF THE INVENTION

To overcome the above-mentioned drawbacks in the prior art, the present invention provides wax oil hydrocracking method and system. In the present invention, naphtha product, high-quality jet fuel product, high-quality diesel oil product, high-quality raw material for producing ethylene by steam cracking, especially for producing high-quality lubricant base oil, which are of different specifications, can be produced from the wax oil through a combined process of hydrocracking with a hydrocracking catalyst and hydrogenation isocracking with a hydrogenation isocracking catalyst.

To attain the object described above, in a first aspect, the present invention provides a wax oil hydrocracking method, which comprises:

(1) controlling wax oil as feedstock and a hydrogen-containing material flow to contact with a pre-hydrotreating catalyst under pre-hydrotreating conditions to obtain a pre-hydrotreated material flow;

(2) controlling the pre-hydrotreated material flow and a hydrogen-containing material flow to contact with a first hydrocracking catalyst to have a first hydrocracking reaction under first hydrocracking conditions to obtain a first hydrocracked material flow, and dividing the first hydrocracked material flow into two parts, i.e., a first hydrocracked material flow A and a first hydrocracked material flow B;

(3) controlling the first hydrocracked material flow B and a hydrogen-containing material flow to contact with a second hydrocracking catalyst to have a second hydrocracking reaction under second hydrocracking condition to obtain a second hydrocracked material flow, and then separating and fractionating the second hydrocracked material flow to obtain a hydrocracked tail oil product; and (4) controlling the first hydrocracked material flow A, at least a part of the hydrocracked tail oil product and a hydrogen-containing material flow to contact with a hydrogenation isocracking catalyst to have a hydrogenation isocracking reaction under hydrogenation isocracking conditions to obtain a hydrogenation isocracked material flow, and then separating and fractionating the hydrogenation isocracked material flow.

Preferably, the method further comprises: separating the first hydrocracked material flow A by gas-liquid separation to obtain a first hydrocracked gas-phase material flow and a first hydrocracked liquid-phase material flow; introducing the first hydrocracked gas-phase material flow into the step (3) to carry out the second hydrocracking reaction; controlling the first hydrocracked liquid-phase material flow, at least a part of the hydrocracked tail oil product and a hydrogen-containing material flow to contact with the hydrogenation isocracking catalyst in the step (4) to carry out the hydrogenation isocracking reaction.

Preferably, the first hydrocracking catalyst and the second hydrocracking catalyst respectively and independently contain a Y zeolite.

Preferably, the hydrogenation isocracking catalyst contains a beta zeolite and/or a SAPO zeolite.

In a second aspect, the present invention provides a wax oil hydrocracking system, which comprises:

a pre-hydrotreating unit;

a first hydrocracking unit, in which a pre-hydrotreated material flow obtained from the pre-hydrotreating unit is treated by first hydrocracking to obtain a first hydrocracked material flow;

a second hydrocracking unit, in which a part of the first hydrocracked material flow is treated by second hydrocracking to obtain a second hydrocracked material flow;

a hydrocracking separation unit, in which the second hydrocracked material flow is separated to obtain a hydrocracked hydrogen-rich gas, a hydrocracked gas product, and a hydrocracked liquid-phase material flow;

a hydrocracking fractionation tower, in which the hydrocracked liquid-phase material flow is fractionated to obtain a hydrocracked tail oil product;

a hydrogenation isocracking reactor, in which the remaining part of the first hydrocracked material flow and at least a part of the hydrocracked tail oil product are treated by hydrogenation isocracking to obtain a hydrogenation isocracked material flow;

a hydrogenation isocracking separation unit, in which the hydrogenation isocracked material flow is separated to obtain a hydrogenation isocracked hydrogen-rich gas, a hydrogenation isocracked gas product, and a hydrogenation isocracked liquid-phase material flow; and a hydrogenation isocracking fractionation tower, in which the hydrogenation isocracked liquid-phase material flow is fractionated.

Preferably, the system further comprises: a gas-liquid separator configured to perform gas-liquid separation of the remaining part of the first hydrocracked material flow to obtain a first hydrocracked gas-phase material flow and a first hydrocracked liquid-phase material flow, the hydrocracked gas-phase material flow is fed into the second hydrocracking unit, and the first hydrocracked liquid-phase material flow is fed into the hydrogenation isocracking reactor.

In the present invention, S, N, O and other impurities in the wax oil are effectively removed and the aromatic hydrocarbons are hydro-saturated to a certain extent when the wax oil passes through the pre-hydrotreating catalyst; the cyclic hydrocarbons in the pre-hydrotreated material flow have a ring-opening reaction partially, the aromatic hydrocarbons are further hydro-saturated and the large molecules are cracked into small molecules, when the pre-hydrotreated material flow continues to pass through the first hydrocracking catalyst; a part of the first hydrocracked material flow is further hydrocracked to obtain an jet fuel, a diesel oil product, and a tail oil product product that has high n-alkanes content and low aromatic hydrocarbon content; the remaining part of the first hydrocracked material flow and at least a part of the hydrocracked tail oil product are hydrogenation isocracked when they pass through the hydrogenation isocracking catalyst, to obtain hydrogenation isocracked products with high i-alkanes content, especially, the diesel oil product has a low solidifying point, and the tail oil product has a low solidifying point and a high viscosity index; in addition, through hydrogenation isocracking of the hydrocracked tail oil product, the isoalkane content in the tail oil product can be increased, the aromatic hydrocarbon content and the polycyclic naphthene content in the tail oil product can be decreased, and the viscosity index of the hydrogenation isocracked tail oil product can be further increased.

Compared with the prior art, the wax oil hydrocracking method and system provided in the present invention have the following advantages:

1. The method provided by the present invention includes two steps of hydrocracking. By dividing the first hydrocracked material flow into two parts in the treatment, the hydrocracked material flows can be allocated effectively without special operation; then the obtained materials undergo different hydrocracking processes (the second hydrocracking reaction and the hydrogenation isocracking reaction) so as to flexibly produce target products that are of different specifications; especially, a high-quality lubricant base oil product can be obtained after the hydrocracked tail oil product continues to pass through the hydrogenation isocracking catalyst. Besides, the method is easy to implement technically. In contrast, in the prior art, though a variety of light products can be obtained by adjusting the conversion ratio and the distillation ranges of the products, usually only one type of light naphtha product, heavy naphtha product, jet fuel product and diesel oil product can be obtained, especially only one tail oil product can be obtained, in a fraction range with one set of hydrocracking unit, since there is only one outlet of hydrocracking reactor; to obtain hydrocracking products that are of different specifications, two or more sets of hydrocracking units are required. The present invention pioneers to provide a hydrocracking process for producing two or more tail oil products that are of different specifications in the same fraction range, two or more jet fuel products that are of different specifications, two or more diesel oil products that are of different specifications, and naphtha products that are of different specifications simultaneously with one set of hydrocracking installation.

2. In the present invention, a part of the first hydrocracked material flow is separated, the part of the first hydrocracked material flow produced through the first hydrocracking reaction is extracted and fed to have a hydrogenation isocracking reaction to further decrease the solidifying point of the part of hydrocracked material flow. Thus, the method provided in the present invention can be used flexibly to produce naphtha products, jet fuel products, diesel oil products, and tail oil products that have different aromatic hydrocarbon contents and different isomeric hydrocarbon contents.

3. In the present invention, the separated first hydrocracked material flow A has high temperature and high pressure. Though the temperature of the first hydrocracked material flow A is slightly decreased after it is mixed with the recycled oil (at least a part of the hydrocracked tail oil product) and the recycled hydrogen (hydrocracked hydrogen-rich gas and/or hydrogenation isocracked hydrogen-rich gas), the material flow can still be directly fed to have the hydrogenation isocracking reaction and attains an expected reaction result. The present invention makes full use of the heat carried by the first hydrocracked material flow A to realize coupled operation of the hydrogenation isocracking reaction and the hydrocracking reaction. Preferably, the first hydrocracked material flow A is separated by gas-liquid separation to obtain a first hydrocracked gas-phase material flow and a first hydrocracked liquid-phase material flow, and then the first hydrocracked gas-phase material flow is introduced into the step (3) to have the second hydrocracking reaction; controlling the first hydrocracked liquid-phase material flow, at least a part of the hydrocracked tail oil product and a hydrogen-containing material flow to contact with the hydrogenation isocracking catalyst in the step (4) to carry out the hydrogenation isocracking reaction. Since the S and N impurities in the wax oil are converted into $H_2S$ and $NH_3$ through the pre-hydrotreatment and partial hydrocracking, and the majority of $H_2S$ and $NH_3$ exist in the first hydrocracked gas-phase material flow after gas-liquid separation and the contents of $H_2S$ and $NH_3$ in the first hydrocracked liquid-phase material flow are much lower, the inhibiting effect on the hydrogenation isocracking catalyst is decreased, and thereby the reactivity of the hydrogenation isocracking catalyst is improved, i.e., the reaction temperature required to attain the same reaction effect is decreased.

4. In a preferred embodiment of the present invention, a hydrocracking catalyst that contain a Y zeolite is employed; among the products obtained through fractionation, the heavy naphtha has relatively high aromatic potential content, the jet fuel product has a relatively high smoke point, the diesel oil product has a relatively high cetane number, and the tail oil product has high paraffin hydrocarbon content and a relatively low BMCI value; after the materials pass through the first hydrocracking catalyst that contains a Y zeolite and the hydrogenation isocracking catalyst, especially after the hydrocracked tail oil product continues to pass through the hydrogenation isocracking catalyst, the obtain naphtha has high isomeric hydrocarbon content, the jet fuel product has a low freezing point, the diesel oil product has a low solidifying point, and the tail oil product has high isomeric hydrocarbon content, a high viscosity index, and a low solidifying point; the hydrocracked tail oil has low content of aromatic hydrocarbons; after the hydrocracked tail oil is hydrogenation isocracked, the viscosity index is improved in the hydrogenation isocracked tail oil. Thus, the present invention can meet the demand for producing naphtha product, jet fuel product, diesel oil product, and tail oil product that are of different specifications.

DESCRIPTION OF THE SYMBOLS OF THE DRAWINGS

Figure 1:
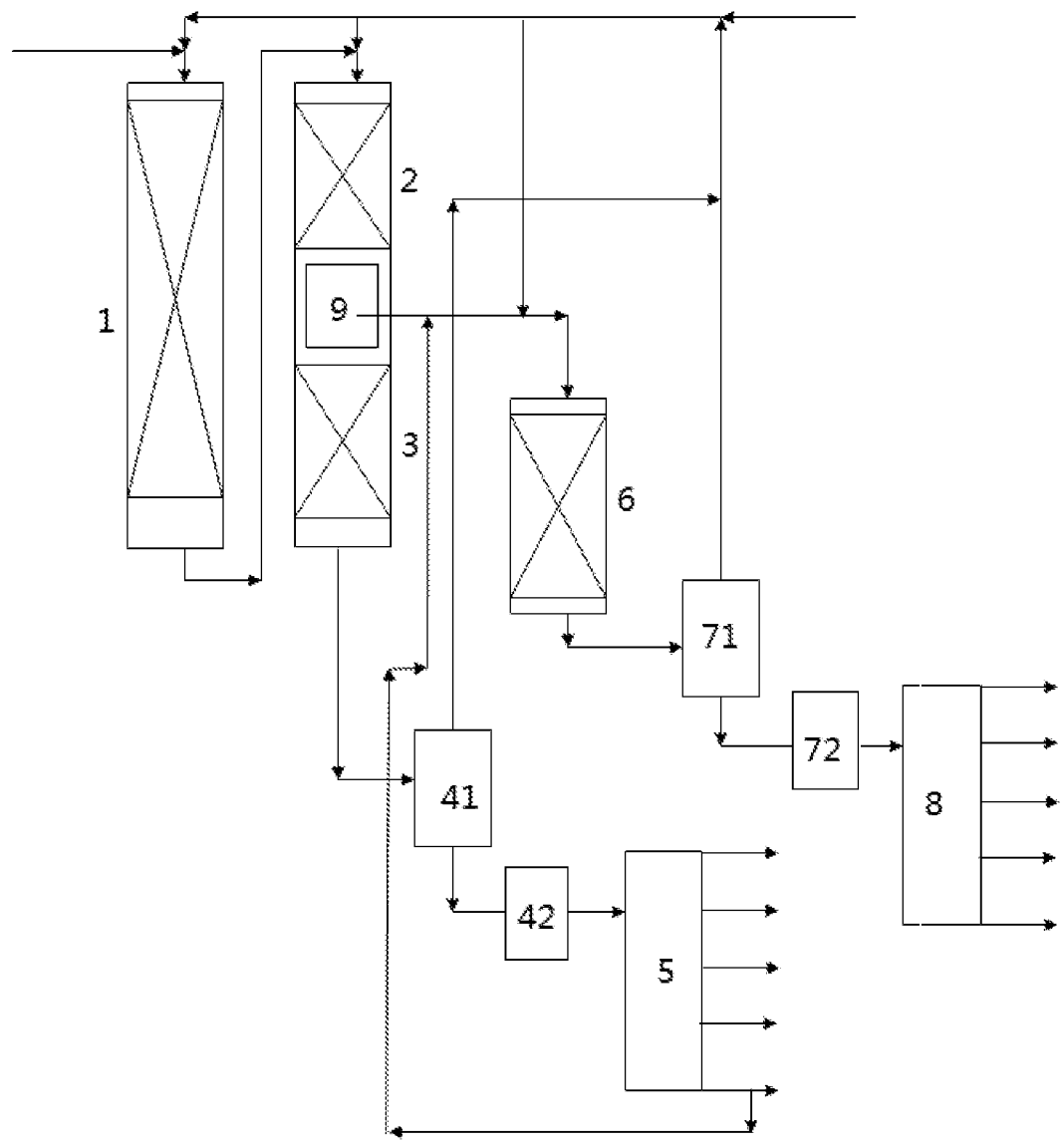
FIG. 1 is a schematic diagram of the wax oil hydrocracking system provided in Example 1 of the present invention.

| | |
|---|---|
| 1. pre-hydrotreating unit | 2. first hydrocracking unit |
| 3. second hydrocracking unit | 41. hydrocracking high-pressure separator |
| 42. hydrocracking low-pressure separator | 5. hydrocracking fractionation tower |
| 6. hydrogenation isocracking reactor | 71. hydrogenation isocracking high-pressure separator |
| 72. hydrogenation isocracking low-pressure separator | 8. hydrogenation isocracking fractionation tower |
| 9. gas-liquid separator | |

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides a wax oil hydrocracking method, which comprises:

(1) controlling wax oil as feedstock and a hydrogen-containing material flow to contact with a pre-hydrotreating catalyst under pre-hydrotreating conditions to obtain a pre-hydrotreated material flow;

(2) controlling the pre-hydrotreated material flow and a hydrogen-containing material flow to contact with a first hydrocracking catalyst to have a first hydrocracking reaction under first hydrocracking conditions to obtain a first hydrocracked material flow, and dividing the first hydrocracked material flow into two parts, i.e., a first hydrocracked material flow A and a first hydrocracked material flow B;

(3) controlling the first hydrocracked material flow B and a hydrogen-containing material flow to contact with a second hydrocracking catalyst to have a second hydrocracking reaction under second hydrocracking condition to obtain a second hydrocracked material flow, and then separating and fractionating the second hydrocracked material flow to obtain a hydrocracked tail oil product; and (4) controlling the first hydrocracked material flow A, at least a part of the hydrocracked tail oil product, and a hydrogen-containing material flow to contact with a hydrogenation isocracking catalyst to have a hydrogenation isocracking reaction under hydrogenation isocracking conditions to obtain a hydrogenation isocracked material flow, and then separating and fractionating the hydrogenation isocracked material flow.

According to the present invention, preferably, the initial boiling point of the wax oil is 100-400° C., and the final boiling point of the wax oil is 405-650° C. For example, the initial boiling point of the wax oil is 320-345° C., and the final boiling point of the wax oil is 546-560° C.

The wax oil may be selected from at least one of vacuum gas oil (VGO), coker gas oil (CGO), deasphalted oil (DAO), catalytic cycle oil(which are obtained through petroleum processing), coal tar, direct coal liquefaction distillate (DCLD), indirect coal liquefaction distillate (ICLD), synthetic oil, and shale oil.

Preferably, the initial boiling point of the hydrocracked tail oil product is 300-375° C.

The hydrogen-containing material flow refers to a material flow that can provide hydrogen, and may be fresh hydrogen, recycled hydrogen, or hydrogen-rich gas. The hydrogen-containing material flows in the steps (1)-(4) in the present invention may be the same or different from each other. Those skilled in the art can clearly understand the hydrogen-containing material flow in the present invention after learning about the technical scheme of the present invention.

According to the present invention, preferably the first hydrocracked material flow A accounts for 5-95 wt % of the wax oil, further preferably is 10-80 wt %, more preferably is 20-45 wt %. The first hydrocracked material flow A may be extracted from the first hydrocracked material flow with an extracting device (e.g., a flow control valve system that has flow display and control functions, not shown in FIG. 2).

According to a preferred embodiment of the present invention, the method further comprises: separating the first hydrocracked material flow A by gas-liquid separation to obtain a first hydrocracked gas-phase material flow and a first hydrocracked liquid-phase material flow; introducing the first hydrocracked gas-phase material flow into the step (3) to carry out the second hydrocracking reaction; controlling the first hydrocracked liquid-phase material flow, at least a part of the hydrocracked tail oil product and a hydrogen-containing material flow to contact with the hydrogenation isocracking catalyst in the step (4) to carry out the hydrogenation isocracking reaction.

According to a preferred embodiment of the present invention, the method comprises:

(1) controlling wax oil as feedstock and a hydrogen-containing material flow to contact with a pre-hydrotreating catalyst under pre-hydrotreating conditions to obtain a pre-hydrotreated material flow;

(2) controlling the pre-hydrotreated material flow and a hydrogen-containing material flow to contact with a first hydrocracking catalyst to have a first hydrocracking reaction under first hydrocracking conditions to obtain a first hydrocracked material flow, dividing the first hydrocracked material flow into two parts, i.e., a first hydrocracked material flow A and a first hydrocracked material flow B, and separating the first hydrocracked material flow A by gas-liquid separation to obtain a first hydrocracked gas-phase material flow and a first hydrocracked liquid-phase material flow;

(3) controlling the first hydrocracked material flow B, the first hydrocracked gas-phase material flow, and a hydrogen-containing material flow to contact with a second hydrocracking catalyst to have a second hydrocracking reaction under second hydrocracking conditions to obtain a second hydrocracked material flow, and then separating and fractionating the second hydrocracked material flow to obtain a hydrocracked tail oil product; and (4) controlling the first hydrocracked liquid-phase material flow, at least a part of the hydrocracked tail oil product and a hydrogen-containing material flow to contact with a hydrogenation isocracking catalyst to have a hydrogenation isocracking reaction under hydrogenation isocracking conditions to obtain a hydrogenation isocracked material flow, and then separating and fractionating the hydrogenation isocracked material flow.

According to the present invention, the gas-liquid separation may be carried out in a gas-liquid separator. The gas-liquid separator at least comprises a reactant inlet, a liquid phase conduit, and a gas phase conduit. Specifically, the first hydrocracked liquid-phase material flow obtained through the separation is extracted through the liquid phase conduit, and the first hydrocracked gas-phase material flow obtained through the separation is led through the gas phase conduit to the unit for the second hydrocracking reaction.

According to a preferred embodiment of the present invention, the first hydrocracked liquid-phase material flow accounts for 5-95 wt % of the wax oil, further preferably is 10-80 wt %, more preferably is 20-45 wt %.

According to the present invention, the pre-hydrotreating catalyst in the step (1) may be any pre-hydrotreating catalyst conventionally used in the art. Preferably, the pre-hydrotreating catalyst contains a carrier and an active component, wherein, the active component is selected from at least one of VIB and/or VIII metal elements, and the carrier is alumina and/or silicon-containing alumina. The VIB metal element usually is Mo and/or W, and the VIII metal element usually is Co and/or Ni. Preferably, based on the total weight of the pre-hydrotreating catalyst and measured in oxide, the content of the VIB metal element is 10-35 wt %, and the content of the VIII metal element is 3-15 wt %. Further preferably, the specific surface area of the pre-hydrotreating catalyst is 100-650 m$^2$/g, and the pore volume of the pre-hydrotreating catalyst is 0.15-0.6 mL/g.

The pre-hydrotreating catalyst may be purchased commercially or prepared. The pre-hydrotreating catalyst in the present invention includes, but is not limited to: pre-hydrotreating catalysts 3936, 3996, FF-16, FF-26, FF-36, FF-46, and FF-56 developed by Sinopec Dalian (Fushun) Research Institute of Petroleum and Petrochemicals, catalysts HC-K and HC-P from UOP, catalysts TK-555 and TK-565 from Topsoe, and catalysts KF-847 and KF-848 from Akzo.

The pre-hydrotreating conditions may be conventional operating conditions. For example, the pre-hydrotreating conditions include: reaction pressure: 3-19 MPa, preferably 5-17 MPa, further preferably 12-17 MPa; reaction temperature: 300-450° C., preferably 320-420° C., further preferably 365-382° C.; liquid hourly space velocity: 0.2-6 $h^{-1}$, preferably 0.3-4.0 $h^{-1}$, further preferably 0.8-1.2 $h^{-1}$; volume ratio of hydrogen to oil: 100-2,000:1, preferably 300-1,500:1, further preferably 800-1,200:1.

The first hydrocracking catalyst and the second hydrocracking catalyst in the present invention may be conventional wax oil hydrocracking catalysts in the art, as long as they have certain hydrogenation activity and certain cracking activity, i.e., the hydrocracking catalysts must ensure that the olefins and aromatic hydrocarbons are hydro-saturated, and must ensure that the saturated aromatic hydrocarbons have a ring-opening reaction. The first hydrocracking catalyst and the second hydrocracking catalyst may be the same or different from each other, and there is no particular restriction on them in the present invention. Preferably, the first hydrocracking catalyst and the second hydrocracking catalyst respectively and independently contain a Y zeolite; further preferably, the first hydrocracking catalyst and the second hydrocracking catalyst contain a carrier and an active component respectively and independently, wherein, the active component is selected from at least one of VIB and/or VIII metal elements, and the carrier contains Y zeolite.

Based on the total weight of the first hydrocracking catalyst and measured in oxide, the content of the VIB metal element may be 10-35 wt %, and the content of the VIII metal element may be 3-15 wt %; the content of the Y zeolite may be 5-80 wt %. Based on the total weight of the second hydrocracking catalyst and measured in oxide, the content of the VIB metal element may be 10-35 wt %, and the content of the VIII metal element may be 3-15 wt %; the content of the Y zeolite may be 5-80 wt %.

The first hydrocracking catalyst and the second hydrocracking catalyst may be purchased commercially or prepared. The first hydrocracking catalyst and the second hydrocracking catalyst in the present invention include, but are not limited to catalysts 3824, 3825, 3976, FC-12, FC-24, FC-26, FC-32, and FC-50 developed by Sinopec Dalian (Fushun) Research Institute of Petroleum and Petrochemicals, and catalysts HC-12, HC-14, HC-24, and HC-39 from UOP.

The first hydrocracking conditions and the second hydrocracking conditions may be conventional operating conditions. For example, the first hydrocracking conditions and the second hydrocracking conditions respectively and independently include: reaction pressure: 3-19 MPa, preferably 5-17 MPa, further preferably 12-17 MPa; reaction temperature: 300-450° C., preferably 320-428° C., further preferably 360-380° C.; liquid hourly space velocity: 0.2-6 $h^{-1}$, preferably 0.5-4.0 $h^{-1}$, further preferably 1.6-3.6 $h^{-1}$; volume ratio of hydrogen to oil: 100-2,000:1, preferably 400-1,500:1, further preferably 1,000-1,500:1.

In the step (3) in the present invention, the first hydrocracked material flow B and the hydrogen-containing material flow are controlled to contact with a second hydrocracking catalyst to have a second hydrocracking reaction; preferably, the first hydrocracked material flow B, the first hydrocracked gas-phase material flow, and the hydrogen-containing material flow are controlled to contact with the second hydrocracking catalyst to have the second hydrocracking reaction. Since the S and N impurities in the wax oil are converted into $H_2S$ and $NH_3$ through the pre-hydrotreatment and the first hydrocracking reaction, and the majority of $H_2S$ and $NH_3$ exist in the first hydrocracked gas-phase material flow after gas-liquid separation and the contents of $H_2S$ and $NH_3$ in the first hydrocracked liquid-phase material flow are much lower, the inhibiting effect on the hydrogenation isocracking catalyst is decreased, and thereby the reactivity of the hydrogenation isocracking catalyst is improved, i.e., the reaction temperature required to attain the same reaction effect is decreased.

According to the present invention, preferably a hydrocracked hydrogen-rich gas, a hydrocracked gas product, and a hydrocracked liquid-phase material flow are obtained through the separation in the step (3).

Preferably, the separation in the step (3) includes high-pressure separation and low-pressure separation, the second hydrocracked material flow is separated by high-pressure separation to obtain a hydrocracked hydrogen-rich gas and a hydrocracked high-pressure separated liquid-phase material flow, and then the hydrocracked high-pressure separated liquid-phase material flow is separated by low-pressure separation to obtain a hydrocracked gas product and the hydrocracked liquid-phase material flow. The high-pressure separation may be carried out in a high-pressure separator, and the low-pressure separation may be carried out in a low-pressure separator. There is no particular restriction on the conditions of the high-pressure separation and the conditions of the low-pressure separation in the present invention. That is to say, the high-pressure separation and the low-pressure separation may be carried out with conventional technical means in the art.

Those skilled in the art may perform fractionation specifically for the hydrocracked liquid-phase material flow according to specific requirements for the products. Preferably, a hydrocracked naphtha product, a hydrocracked jet fuel product, a hydrocracked diesel oil product, and the hydrocracked tail oil product are obtained through fractionation of the hydrocracked liquid-phase material flow; further preferably, a hydrocracked light naphtha product, a hydrocracked heavy naphtha product, a hydrocracked jet fuel product, a hydrocracked diesel oil product, and a hydrocracked tail oil product are obtained through the fractionation of the hydrocracked liquid-phase material flow.

The fractionation in the step (3) in the present invention may be carried out in a hydrocracking fractionation tower, and the hydrocracked liquid-phase material flow is fractionated in the hydrocracking fractionation tower to obtain a hydrocracked naphtha product (preferably a hydrocracked light naphtha product and a hydrocracked heavy naphtha product), a hydrocracked jet fuel product, a hydrocracked diesel oil product, and a hydrocracked tail oil product.

There is no particular restriction on the conditions of the fractionation in the step (3) in the present invention, as long as the above-mentioned products can be obtained. For example, different hydrocracked products can be obtained through the fractionation; the initial boiling point of the hydrocracked light naphtha product may be 35-45° C., the cutting temperature between the hydrocracked light naphtha product and the hydrocracked heavy naphtha product may be 60-75° C., the cutting temperature between the hydrocracked heavy naphtha product and the hydrocracked jet fuel product may be 135-177° C., the cutting temperature between the hydrocracked jet fuel product and the hydrocracked diesel oil product may be 220-280° C., and the cutting temperature between the hydrocracked diesel oil product and the hydrocracked tail oil product may be 300-375° C., i.e., the initial boiling point of the hydrocracked tail oil product.

According to the method provided in the present invention, the hydrocracked tail oil product may be fully fed for the hydrogenation isocracking reaction in the step (4), or may be partially fed for the hydrogenation isocracking reaction in the step (4), and the remaining part may be taken as a product.

According to a preferred embodiment of the present invention, the hydrocracked tail oil product in the step (4) accounts for 10-100 wt % of the hydrocracked tail oil product obtained in the step (3), preferably is 15-100 wt %.

According to a preferred embodiment of the present invention, the first hydrocracked material flow A accounts for 10-90 wt % of the total weight of the first hydrocracked material flow A and the hydrocracked tail oil product fed for the hydrogenation isocracking reaction, preferably is 50-90 wt %.

According to the present invention, the pre-hydrotreatment in the step (1), the first hydrocracking reaction in the step (2), and the second hydrocracking reaction in the step (3) may be carried out in one hydrogenation reactor or in two or three hydrogenation reactors. Specifically, in the case that the pre-hydrotreatment in the step (1), the first hydrocracking reaction in the step (2), and the second hydrocracking reaction in the step (3) are carried out in one hydrogenation reactor, a pre-hydrotreating catalyst bed layer, a first hydrocracking catalyst bed layer, and a second hydrocracking catalyst bed layer are arranged sequentially in the hydrogenation reactor. In the case that the pre-hydrotreatment in the step (1), the first hydrocracking reaction in the step (2), and the second hydrocracking reaction in the step (3) are carried out in two hydrogenation reactors, the pre-hydrotreatment in the step (1) may be carried out in a pre-hydrotreating reactor that is provided with a pre-hydrotreating catalyst bed layer, and the first hydrocracking reaction in the step (2) and the second hydrocracking reaction in the step (3) are carried out in a hydrocracking reactor that is provided with a first hydrocracking catalyst bed layer and a second hydrocracking catalyst bed layer, the first hydrocracked material flow A is extracted, and the first hydrocracked material flow B is fed into the second hydrocracking catalyst bed layer; preferably, a gas-liquid separator is arranged between the first hydrocracking catalyst bed layer and the second hydrocracking catalyst bed layer. In the case that the pre-hydrotreatment in the step (1), the first hydrocracking reaction in the step (2), and the second hydrocracking reaction in the step (3) are carried out in three hydro-treating reactors, a pre-hydrotreating catalyst bed layer, a first hydrocracking catalyst bed layer, and a second hydrocracking catalyst bed layer are provided in each of the hydro-treating reactors respectively.

According to a preferred embodiment of the present invention, the method further comprises: controlling the wax oil to contact with a hydroprocessing guard catalyst first and contact with the pre-hydrotreating catalyst then. That preferred embodiment is more favorable for prolonging the service life of the pre-hydrotreating catalyst. Specifically, the hydroprocessing guard catalyst may be charged on the top of the pre-hydrotreating catalyst bed layer (i.e., the hydroprocessing guard catalyst and the pre-hydrotreating catalyst jointly form the pre-hydrotreating catalyst bed layer). There is no particular requirement for the hydroprocessing guard catalyst in the present invention. In other words, the hydroprocessing guard catalyst may be any hydroprocessing guard catalyst that is conventionally used in the art, such as the FZC series catalysts developed by Sinopec Dalian (Fushun) Research Institute of Petroleum and Petrochemicals, including FZC-100, FZC-105, and FZC-106.

According to a preferred embodiment of the present invention, the charged amount of the hydroprocessing guard catalyst accounts for 5-20 vol % of the total charged amount of the hydroprocessing guard catalyst and the pre-hydrotreating catalyst, preferably is 10-15 vol %.

According to a preferred embodiment of the present invention, the method further comprises: a hydro-treating catalyst is charged respectively on the bottom of the second hydrocracking catalyst bed layer and the hydrogenation isocracking catalyst bed layer respectively (i.e., the second hydrocracking catalyst and the hydro-treating catalyst jointly form the second hydrocracking catalyst bed layer; the hydrogenation isocracking catalyst and the hydro-treating catalyst jointly form the hydrogenation isocracking catalyst bed layer). The hydro-treating catalyst in the second hydrocracking catalyst bed layer and the hydro-treating catalyst in the hydrogenation isocracking catalyst bed layer may be the same or different from each other, and there is no particular restriction on them in the present invention. The hydro-treating catalyst is used to ensure that the olefins in the material flow that passes through the second hydrocracking catalyst and the hydrogenation isocracking catalyst is further saturated. The hydro-treating catalyst may be any hydro-treating catalyst conventionally used in the art, and may be of the same type as the pre-hydrotreating catalyst described above. For example, the hydro-treating catalyst may be pre-hydrotreating catalysts 3936, 3996, FF-16, FF-26, FF-36, FF-46, and FF-56 developed by Sinopec Dalian (Fushun) Research Institute of Petroleum and Petrochemicals.

According to a preferred embodiment of the present invention, the volume ratio of the hydro-treating catalyst in the second hydrocracking catalyst bed layer to the second hydrocracking catalyst is 0.05-0.3:1, preferably is 0.1-0.25:1.

According to a preferred embodiment of the present invention, the volume ratio of the hydro-treating catalyst in the hydrogenation isocracking catalyst bed layer to the hydrogenation isocracking catalyst is 0.05-0.5:1, preferably is 0.1-0.5:1.

According to the present invention, the hydrogenation isocracking catalyst in the step (4) may be any hydrogenation isocracking catalyst conventionally used in the art; preferably, the hydrogenation isocracking catalyst contains a beta zeolite and/or SAPO zeolite. Generally, the hydrogenation isocracking catalyst contains a carrier and an active constituent, wherein, the active constituent is selected from at least one of VIB and/or VIII metal elements. The VIB metal element usually is Mo and/or W, and the VIII metal element usually is Co and/or Ni. The carrier may contain at least one of alumina, silicon-containing alumina, and zeolite, preferably contains a zeolite, further preferably contains beta zeolite and/or SAPO zeolite. Preferably, based on the total weight of the hydrogenation isocracking catalyst and measured in oxide, the content of the VIB metal element is 10-35 wt %, the content of the VIII metal element is 3-15 wt %, and the content of the beta zeolite and/or SAPO zeolite is 5-80 wt %. The hydrogenation isocracking catalyst in the present invention includes, but is not limited to catalysts FC-14 and FC-20 developed by Sinopec Dalian (Fushun) Research Institute of Petroleum and Petrochemicals. The hydrogenation isocracking catalyst must have certain hydrogenation activity and certain cracking activity, i.e., it must ensure that the olefins and aromatic hydrocarbons in the reaction materials are hydro-saturated, and must ensure that the straight-chain paraffins have an isomerization reaction.

The hydrogenation isocracking conditions may be conventional operating conditions. For example, hydrogenation isocracking conditions include: reaction pressure: 3-19 MPa, preferably 5-17 MPa, further preferably 12-17 MPa; reaction temperature: 300-450° C., preferably 320-428° C., further preferably 325-388° C.; liquid hourly space velocity: 0.2-6 h$^{-1}$, preferably 0.5-6.0 h$^{-1}$, further preferably 1.5-6.0 h$^{-1}$; volume ratio of hydrogen to oil: 100-2,000:1, preferably 400-1,500:1, further preferably 700-1,300:1. Further preferably, the first hydrocracked material flow A is separated by gas-liquid separation to obtain a first hydrocracked gas-phase material flow and a first hydrocracked liquid-phase material flow; the first hydrocracked gas-phase material flow is introduced into the step (3) to carry out the second hydrocracking reaction; in the step (4), controlling the first hydrocracked liquid-phase material flow, at least a part of the hydrocracked tail oil product and a hydrogen-containing material flow to contact with the hydrogenation isocracking catalyst to have the hydrogenation isocracking reaction at 320-420° C., preferably 325-350° C.; if the raw materials of reaction in the step (4) are the first hydrocracked material flow A and at least a part of the hydrocracked tail oil product, the temperature of the hydrogenation isocracking reaction is 330-428° C., preferably 380-388° C. The scheme of performing gas-liquid separation of the first hydrocracked material flow A is more favorable for decreasing the temperature required for the hydrogenation isocracking reaction to attain the same reaction effect.

According to the present invention, the hydrogenation isocracking reaction may be carried out in a hydrogenation isocracking reactor, which is provided with a hydrogenation isocracking catalyst bed layer.

According to the present invention, preferably a hydrogenation isocracked hydrogen-rich gas, a hydrogenation isocracked gas product, and a hydrogenation isocracked liquid-phase material flow are obtained through the separation in the step (4).

Preferably, the separation in the step (4) comprises high-pressure separation and low-pressure separation, the hydrogenation isocracked material flow is separated by high-pressure separation to obtain a hydrogenation isocracked hydrogen-rich gas and a hydrogenation isocracked high-pressure separated liquid-phase material flow, and then the hydrogenation isocracked high-pressure separated liquid-phase material flow is separated by low-pressure separation to obtain a hydrogenation isocracked gas product and the hydrogenation isocracked liquid-phase material flow. The high-pressure separation may be carried out in a high-pressure separator, and the low-pressure separation may be carried out in a low-pressure separator. There is no particular restriction on the conditions of the high-pressure separation and the conditions of the low-pressure separation in the present invention. That is to say, the high-pressure separation and the low-pressure separation may be carried out with conventional technical means in the art.

Those skilled in the art may perform fractionation specifically for the hydrogenation isocracked liquid-phase material flow according to specific requirements for the products. Preferably, a hydrogenation isocracked naphtha product, a hydrogenation isocracked jet fuel product, a hydrogenation isocracked diesel oil product, and a hydrogenation isocracked tail oil product are obtained through fractionation of the hydrogenation isocracked liquid-phase material flow; further preferably, a hydrogenation isocracked light naphtha product, a hydrogenation isocracked heavy naphtha product, a hydrogenation isocracked jet fuel product, a hydrogenation isocracked diesel oil product, and a hydrogenation isocracked tail oil product are obtained through fractionation of the hydrogenation isocracked liquid-phase material flow.

The fractionation in the step (4) in the present invention may be carried out in a hydrogenation isocracking fractionation tower; specifically, the hydrogenation isocracked liquid-phase material flow is fractionated in the hydrogenation isocracking fractionation tower to obtain a hydrogenation isocracked naphtha product (preferably a hydrogenation isocracked light naphtha product and a hydrogenation isocracked heavy naphtha product), a hydrogenation isocracked jet fuel product, a hydrogenation isocracked diesel oil product, and a hydrogenation isocracked tail oil product.

There is no particular restriction on the conditions of the fractionation in the step (4) in the present invention, as long as the above-mentioned products can be obtained. For example, different hydrogenation isocracked products can be obtained through the fractionation. The initial boiling point of the hydrogenation isocracked light naphtha product is 35-45° C., the cutting temperature between the hydrogenation isocracked light naphtha product and the hydrogenation isocracked heavy naphtha product is 60-75° C., the cutting temperature between the hydrogenation isocracked heavy naphtha product and the hydrogenation isocracked jet fuel product is 135-177° C., the cutting temperature between the hydrogenation isocracked jet fuel product and the hydrogenation isocracked diesel oil product is 220-280° C., and the cutting temperature between the hydrogenation isocracked diesel oil product and the hydrogenation isocracked tail oil product is 300-375° C.

According to a preferred embodiment of the present invention, the method further comprises: recycling the hydrocracked hydrogen-rich gas and the hydrogenation isocracked hydrogen-rich gas to provide required hydrogen-containing material flow. The hydrocracked hydrogen-rich gas and the hydrogenation isocracked hydrogen-rich gas may be respectively and independently recycled to the steps (1)-(4); make-up hydrogen may be introduced if the hydrocracked hydrogen-rich gas and the hydrogenation isocracked hydrogen-rich gas are not enough to provide hydrogen required by the method provided in the present invention. Those skilled in the art can clearly understand how to recycle the hydrocracked hydrogen-rich gas and the hydrogenation isocracked hydrogen-rich gas after learning about the technical scheme of the present invention.

In the present invention, both the hydrocracked gas product and the hydrogenation isocracked gas product are a hydrocarbon-rich gas. In addition, the hydrocracked gas product and the hydrogenation isocracked gas product may be separated according to the actual requirement to obtain desired gas products.

The hydrocracked gas product and the hydrogenation isocracked gas product in the steps (3) and (4) may be taken as products separately or may be mixed to obtain a mixed gas product.

The hydrocracked naphtha product and the hydrogenation isocracked naphtha product in the steps (3) and (4) may be taken as products separately or may be mixed to obtain a mixed naphtha product (preferably, the hydrocracked light naphtha product and the hydrogenation isocracked light naphtha product in the steps (3) and (4) may be taken as products separately or may be mixed to obtain a mixed light naphtha product; the hydrocracked heavy naphtha product and the hydrogenation isocracked heavy naphtha product in the steps (3) and (4) may be taken as products separately or may be mixed to obtain a mixed heavy naphtha product).

The hydrocracked jet fuel product and the hydrogenation isocracked jet fuel product in the steps (3) and (4) may be taken as products separately or may be mixed to obtain a mixed jet fuel product.

The hydrocracked diesel oil product and the hydrogenation isocracked diesel oil product in the steps (3) and (4) may be taken as products separately or may be mixed to obtain a mixed diesel oil product.

The hydrocracked tail oil in the step (3) that is not introduced into the step (4) may be taken as a product separately.

The hydrogenation isocracked tail oil in the step (4) may be taken as a product separately.

Figure 2:
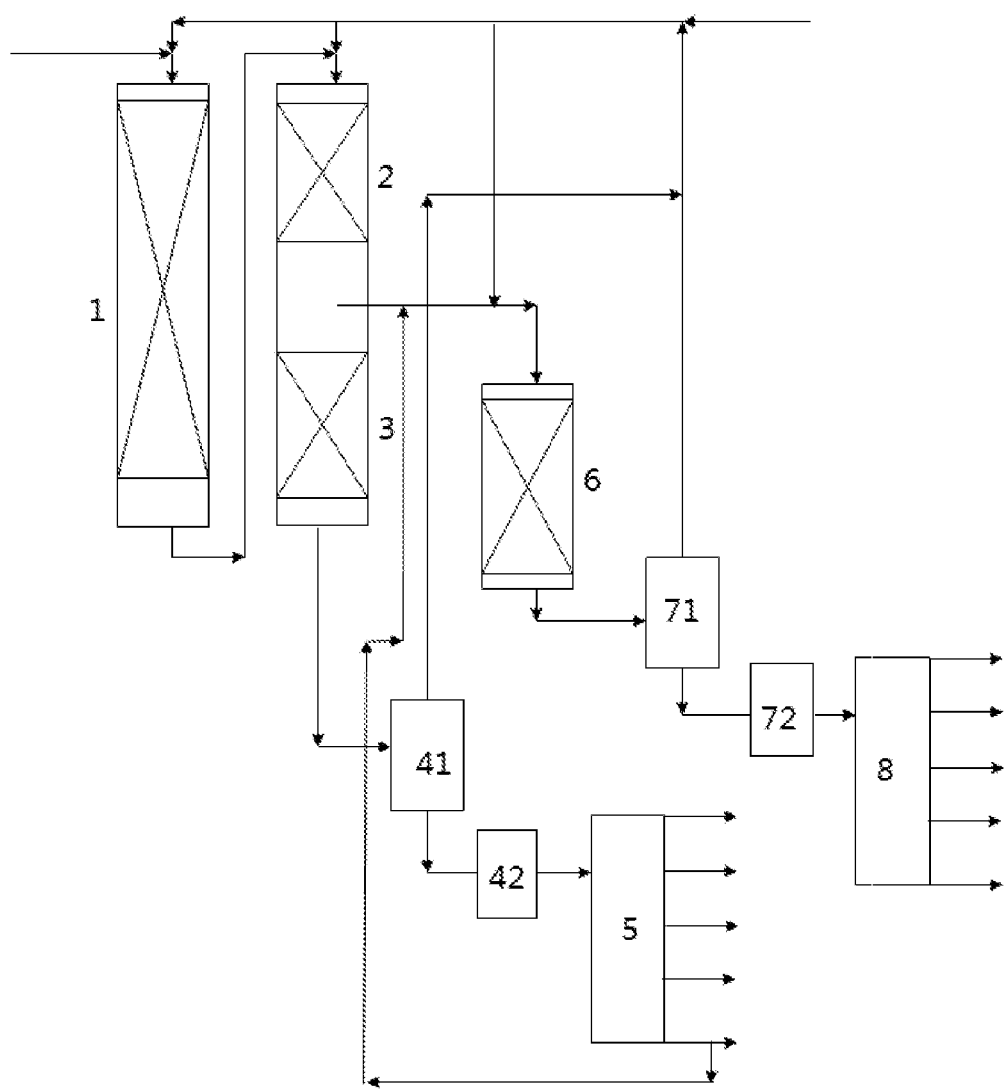
FIG. 2 is a schematic diagram of the wax oil hydrocracking system provided in Example 4 of the present invention.

In a second aspect, the present invention provides a wax oil hydrocracking system. As shown in FIGS. 1 and 2, the wax oil hydrocracking system comprises:

a pre-hydrotreating unit 1;

a first hydrocracking unit 2, in which a pre-hydrotreated material flow obtained from the pre-hydrotreating unit 1 is treated by first hydrocracking to obtain a first hydrocracked material flow;

a second hydrocracking unit 3, in which a part of the first hydrocracked material flow is treated by second hydrocracking to obtain a second hydrocracked material flow;

a hydrocracking separation unit, in which the second hydrocracked material flow is separated to obtain a hydrocracked hydrogen-rich gas, a hydrocracked gas product, and a hydrocracked liquid-phase material flow;

a hydrocracking fractionation tower 5, in which the hydrocracked liquid-phase material flow is fractionated to obtain a hydrocracked tail oil product;

a hydrogenation isocracking reactor 6, in which the remaining part of the first hydrocracked material flow and at least a part of the hydrocracked tail oil product are treated by hydrogenation isocracking to obtain a hydrogenation isocracked material flow;

a hydrogenation isocracking separation unit, in which the hydrogenation isocracked material flow is separated to obtain a hydrogenation isocracked hydrogen-rich gas, a hydrogenation isocracked gas product, and a hydrogenation isocracked liquid-phase material flow; and a hydrogenation isocracking fractionation tower 8, in which the hydrogenation isocracked liquid-phase material flow is fractionated.

According to an embodiment of the present invention, the system further comprises: an extracting device, which configured to extract a part of the first hydrocracked material flow and feed it to the hydrogenation isocracking reactor 6 for hydrogenation isocracking. The extracting device may be a flow control valve system that has flow display and control functions.

According to the present invention, preferably, the system further comprises: a gas-liquid separator 9 configured to perform gas-liquid separation of the remaining part of the first hydrocracked material flow to obtain a first hydrocracked gas-phase material flow and a first hydrocracked liquid-phase material flow, the first hydrocracked gas-phase material flow is fed into the second hydrocracking unit 3, and the first hydrocracked liquid-phase material flow is fed into the hydrogenation isocracking reactor 6.

According to an embodiment of the present invention, the gas-liquid separator 9 comprises a reactant inlet, a liquid phase conduit, and a gas phase conduit; the remaining part of the first hydrocracked material flow is fed through a reactant inlet into the gas-liquid separator 9 for gas-liquid separation to obtain a first hydrocracked gas-phase material flow and a first hydrocracked liquid-phase material flow, the first hydrocracked gas-phase material flow is led through the gas phase conduit to the second hydrocracking unit 3, and the first hydrocracked liquid-phase material flow is led through the liquid phase conduit to the hydrogenation isocracking reactor 6.

According to the system provided in the present invention, preferably, the hydrocracking separation unit comprises a hydrocracking high-pressure separator 41 and a hydrocracking low-pressure separator 42 that are connected in series, the second hydrocracked material flow is separated in the hydrocracking high-pressure separator 41 to obtain a hydrocracked hydrogen-rich gas and a hydrocracked high-pressure separated liquid-phase material flow; the hydrocracked high-pressure separated liquid-phase material flow is separated in the hydrocracking low-pressure separator 42 to obtain a hydrocracked gas product and the hydrocracked liquid-phase material flow.

According to the system provided in the present invention, preferably, the hydrogenation isocracking separation unit comprises a hydrogenation isocracking high-pressure separator 71 and a hydrogenation isocracking low-pressure separator 72 that are connected in series, the hydrogenation isocracked material flow is separated in the hydrogenation isocracking high-pressure separator 71 to obtain a hydrogenation isocracked hydrogen-rich gas and a hydrogenation isocracked high-pressure separated liquid-phase material flow; the hydrogenation isocracked high-pressure separated liquid-phase material flow is separated in the hydrogenation isocracking low-pressure separator 72 to obtain a hydrogenation isocracked gas product and the hydrogenation isocracked liquid-phase material flow.

There is no particular restriction on the hydrocracking high-pressure separator 41 and the hydrogenation isocracking high-pressure separator 71 in the present invention; in other words, they may be various high-pressure separators conventionally used in the art. Likewise, there is no particular restriction on the hydrocracking low-pressure separator 42 and the hydrogenation isocracking low-pressure separator 72 in the present invention; in other words, they may be various low-pressure separators conventionally used in the art.

According to a preferred embodiment of the present invention, the gas phase outlet of the hydrocracking high-pressure separator 41 and the gas phase outlet of the hydrogenation isocracking high-pressure separator 71 respectively and independently communicate with at least one of the inlet of the pre-hydrotreating unit 1, the inlet of the first hydrocracking unit 2, the inlet of the second hydrocracking unit 3, and the inlet of the hydrogenation isocracking reactor 6, to recycle the hydrocracked hydrogen-rich gas and the hydrogenation isocracked hydrogen-rich gas so as to provide a hydrogen-containing material flow required for the system.

There is no particular restriction on the hydrocracking fractionation tower 5 in the present invention, as long as the hydrocracked tail oil product can be obtained through fractionation. Those skilled in the art can fractionate the hydrocracked liquid-phase material flow specifically according to specific requirements for the products. The products obtained through fractionation of the hydrocracked liquid-phase material flow are described above, and will not be further detailed here.

According to the present invention, the hydrocracked tail oil product outlet of the hydrocracking fractionation tower 5 communicates with the inlet of the hydrogenation isocracking reactor 6 through a pipeline. A hydrocracked tail oil product extraction pipeline may be further connected to the pipeline. Namely, the hydrocracked tail oil product may be fully or partially fed into the hydrogenation isocracking reactor 6 for hydrogenation isocracking.

There is no particular restriction on the hydrogenation isocracking fractionation tower 8 in the present invention, as long as it can fractionate the hydrogenation isocracked liquid-phase material flow. Those skilled in the art can fractionate the hydrogenation isocracked liquid-phase material flow specifically according to specific requirements for the products. The products obtained through fractionation of the hydrogenation isocracked liquid-phase material flow are described above, and will not be further detailed here.

According to a specific embodiment of the present invention, the pre-hydrotreating unit 1, the first hydrocracking unit 2, and the second hydrocracking unit 3 are arranged in one hydrogenation reactor.

According to a specific embodiment of the present invention, the pre-hydrotreating unit 1, the first hydrocracking unit 2, and the second hydrocracking unit 3 are respectively arranged in different hydrogenation reactors.

According to a specific embodiment of the present invention, the pre-hydrotreating unit 1 is separately arranged in a hydrogenation reactor (e.g., a pre-hydrotreating reactor), and the first hydrocracking unit 2 and the second hydrocracking unit 3 are arranged in a hydrogenation reactor (e.g., a hydrocracking reactor) together.

Hereunder the wax oil hydrocracking method and system in an embodiment of the present invention will be detailed with reference to FIG. 1.

Wax oil and a hydrogen-containing material flow are fed into a pre-hydrotreating reactor 1 that is provided with a pre-hydrotreating catalyst bed layer (charged with a hydroprocessing guard catalyst and a pre-hydrotreating catalyst) to have a reaction to obtain a pre-hydrotreated material flow;

The pre-hydrotreated material flow and a hydrogen-containing material flow are fed into a hydrocracking reactor that is provided with a first hydrocracking unit 2 (a first hydrocracking catalyst bed layer), a second hydrocracking unit 3 (a second hydrocracking catalyst bed layer), and a gas-liquid separator 9 arranged between the first hydrocracking unit 2 and the second hydrocracking unit 3; a first hydrocracked material flow is obtained after the pre-hydrotreated material flow and the hydrogen-containing material flow pass through the first hydrocracking unit 2, a part of the first hydrocracked material flow (first hydrocracked material flow A) is extracted in the gas-liquid separator 9 and is separated by gas-liquid separation to obtain a first hydrocracked gas-phase material flow and a first hydrocracked liquid-phase material flow;

The remaining part of the first hydrocracked material flow (first hydrocracked material flow B), the first hydrocracked gas-phase material flow, and a hydrogen-containing material flow are fed into the second hydrocracking catalyst bed layer to obtain a second hydrocracked material flow; the second hydrocracked material flow is fed into the hydrocracking high-pressure separator 41 to obtain a hydrocracked hydrogen-rich gas and a hydrocracked high-pressure separated liquid-phase material flow, and then the hydrocracked high-pressure separated liquid-phase material flow is fed into the hydrocracking low-pressure separator 42 and separated to obtain a hydrocracked gas product and a hydrocracked liquid-phase material flow; the hydrocracked liquid-phase material flow is fed into the hydrocracking fractionation tower 5 and fractionated to obtain a hydrocracked light naphtha product, a hydrocracked heavy naphtha product, a hydrocracked jet fuel product, a hydrocracked diesel oil product, and a hydrocracked tail oil product;

The first hydrocracked liquid-phase material flow, a part of the hydrocracked tail oil product, and a hydrogen-containing material flow are fed into the hydrogenation isocracking reactor 6 for hydrogenation isocracking, to obtain a hydrogenation isocracked material flow; the hydrogenation isocracked material flow is fed into the hydrogenation isocracking high-pressure separator 71 and separated to obtain a hydrogenation isocracked hydrogen-rich gas and a hydrogenation isocracked high-pressure separated liquid-phase material flow, and then the hydrogenation isocracked high-pressure separated liquid-phase material flow is fed into the hydrogenation isocracking low-pressure separator 72 and separated to obtain a hydrogenation isocracked gas product and a hydrogenation isocracked liquid-phase material flow; the hydrogenation isocracked liquid-phase material flow is fed into the hydrogenation isocracking fractionation tower 8 and fractionated to obtain a hydrogenation isocracked light naphtha product, a hydrogenation isocracked heavy naphtha product, a hydrogenation isocracked jet fuel product, a hydrogenation isocracked diesel oil product, and a hydrogenation isocracked tail oil product.

The hydrocracked light naphtha product and the hydrogenation isocracked light naphtha product may be taken as products separately or may be mixed to obtain a mixed light naphtha product; the hydrocracked heavy naphtha product and the hydrogenation isocracked heavy naphtha product may be taken as products separately or may be mixed to obtain a mixed heavy naphtha product; the hydrocracked jet fuel product and the hydrogenation isocracked jet fuel product may be taken as products separately or may be mixed to obtain a mixed jet fuel product; the hydrocracked diesel oil product and the hydrogenation isocracked diesel oil product may be taken as products separately or may be mixed to obtain a mixed diesel oil product. The hydrocracked hydrogen-rich gas and the hydrogenation isocracked hydrogen-rich gas are recycled and used together with make-up hydrogen to provide the hydrogen-containing material flow required for the system.

Hereunder the technical scheme and effects of the present invention will be detailed in examples.

In the following examples, the hydroprocessing guard catalysts are hydroprocessing guard catalysts FZC-100, FZC-105, and FZC-106 developed by Sinopec Dalian (Fushun) Research Institute of Petroleum and Petrochemicals;

The pre-hydrotreating catalyst and the hydro-treating catalyst are catalyst FF-56 developed by Sinopec Dalian (Fushun) Research Institute of Petroleum and Petrochemicals;

The first hydrocracking catalyst and the second hydrocracking catalyst are catalyst FC-32 developed by Sinopec Dalian (Fushun) Research Institute of Petroleum and Petrochemicals, which contains a Y zeolite;

The hydrogenation isocracking catalyst is catalyst FC-20 developed by Sinopec Dalian (Fushun) Research Institute of Petroleum and Petrochemicals, which contains a beta zeolite.

The main properties of the three types of wax oil are listed in Table 1.

TABLE 1

|  | Wax oil 1 | Wax oil 2 | Wax oil 3 |
|---|---|---|---|
| Density, g/cm$^3$ | 0.903 | 0.918 | 0.905 |
| Fraction range, ° C. | 320-548 | 345-560 | 320-546 |

TABLE 1-continued

|  | Wax oil 1 | Wax oil 2 | Wax oil 3 |
|---|---|---|---|
| Sulfur content, wt % | 1.0 | 2.0 | 1.1 |
| Nitrogen content, wt % | 0.145 | 0.075 | 0.132 |
| Solidifying point, °C. | 33 | 34 | 32 |

EXAMPLES 1-3

(1) Wax oil as feedstock and hydrogen are fed into a pre-hydrotreating reactor 1 that is provided with a pre-hydrotreating catalyst bed layer (charged with a hydroprocessing guard catalyst and a pre-hydrotreating catalyst) to have a reaction to obtain a pre-hydrotreated material flow; the pre-hydrotreating reaction conditions are listed in Table 2.

(2) The pre-hydrotreated material flow and hydrogen are fed into a hydrocracking reactor that is provided with a first hydrocracking unit 2 (a first hydrocracking catalyst bed layer), a second hydrocracking unit 3 (a second hydrocracking catalyst bed layer), and a gas-liquid separator 9 arranged between the first hydrocracking unit 2 and the second hydrocracking unit 3; a first hydrocracked material flow is obtained after the pre-hydrotreated material flow and hydrogen pass through the first hydrocracking catalyst bed layer, a part of the first hydrocracked material flow (first hydrocracked material flow A) is extracted in the gas-liquid separator 9 and is separated by gas-liquid separation to obtain a first hydrocracked gas-phase material flow and a first hydrocracked liquid-phase material flow; the first hydrocracking reaction conditions are listed in Table 2.

(3) The remaining part of the first hydrocracked material flow (first hydrocracked material flow B), the first hydrocracked gas-phase material flow, and hydrogen are fed into the second hydrocracking catalyst bed layer to have a second hydrocracking reaction (the conditions are listed in Table 2), to obtain a second hydrocracked material flow; the second hydrocracked material flow is fed into the hydrocracking high-pressure separator 41 for high-pressure separation, to obtain a hydrocracked hydrogen-rich gas and a hydrocracked high-pressure separated liquid-phase material flow, and then the hydrocracked high-pressure separated liquid-phase material flow is fed into the hydrocracking low-pressure separator 42 for low-pressure separation, to obtain a hydrocracked gas product and a hydrocracked liquid-phase material flow; the hydrocracked liquid-phase material flow is fed into the hydrocracking fractionation tower 5 and fractionated to obtain a hydrocracked light naphtha product (the distillation range is 37-65° C.), a hydrocracked heavy naphtha product (the distillation range is 65-165° C.), a hydrocracked jet fuel product (the distillation range is 165-265° C.), a hydrocracked diesel oil product (the distillation range is 265-365° C.), and a hydrocracked tail oil product (the distillation range is >365° C.).

(4) The first hydrocracked liquid-phase material flow, a part of the hydrocracked tail oil product, and hydrogen are fed into the hydrogenation isocracking reactor 6 for hydrogenation isocracking (the conditions are listed in Table 2), to obtain a hydrogenation isocracked material flow; the hydrogenation isocracked material flow is fed into the hydrogenation isocracking high-pressure separator 71 for high-pressure separation, to obtain a hydrogenation isocracked hydrogen-rich gas and a hydrogenation isocracked high-pressure separated liquid-phase material flow, and then the hydrogenation isocracked high-pressure separated liquid-phase material flow is fed into the hydrogenation isocracking low-pressure separator 72 for low-pressure separation, to obtain a hydrogenation isocracked gas product and a hydrogenation isocracked liquid-phase material flow; the hydrogenation isocracked liquid-phase material flow is fed into the hydrogenation isocracking fractionation tower 8 and fractionated to obtain a hydrogenation isocracked light naphtha product (the distillation range is 37-65° C.), a hydrogenation isocracked heavy naphtha product (the distillation range is 65-165° C.), a hydrogenation isocracked jet fuel product (the distillation range is 165-265° C.), a hydrogenation isocracked diesel oil product (the distillation range is 265-365° C.), and a hydrogenation isocracked tail oil product (the distillation range is >365° C.).

Wherein, the hydrocracked hydrogen-rich gas and the hydrogenation isocracked hydrogen-rich gas are recycled and used together with make-up hydrogen to provide hydrogen required for the system.

In the Table 2, the FZC series refers to a composite of 10 vol % FZC-100, 30 vol % FZC-105, and 60 vol % FZC-106.

TABLE 2

|  | Example 1 | Example 2 | Example 3 |
|---|---|---|---|
| Pre-hydrotreating conditions | | | |
| Feedstock | Wax oil 1 | Wax oil 1 | Wax oil 2 |
| Catalyst | FZC series/FF-56 | FZC series/FF-56 | FZC series/FF-56 |
| Volume ratio of catalyst | 10:90 | 10:90 | 15:85 |
| Reaction pressure, MPa | 12.0 | 17.0 | 15.0 |
| Hydrogen to oil at inlet(v/v) | 800:1 | 1000:1 | 1200:1 |
| Total volumetric space velocity, $h^{-1}$ | 1.1 | 0.8 | 1.2 |
| Average reaction temperature, °C. | 382 | 375 | 365 |
| First hydrocracking reaction conditions | | | |
| Feedstock | Pre-hydrotreated material flow | | |
| Catalyst | FC-32 | FC-32 | FC-32 |
| Reaction pressure, MPa | 12.0 | 17.0 | 15.0 |
| Hydrogen to oil at inlet(v/v) | 1000:1 | 1200:1 | 1500:1 |
| Volumetric space velocity, $h^{-1}$ | 2.5 | 1.6 | 3.0 |
| Average reaction temperature, °C. | 380 | 375 | 360 |
| Second hydrocracking reaction conditions | | | |
| Feedstock | First hydrocracked material flow B and first hydrocracked gas-phase material flow | | |
| Catalyst | FC-32/FF-56 | FC-32/FF-56 | FC-32/FF-56 |
| Reaction pressure, MPa | 12.0 | 17.0 | 15.0 |

TABLE 2-continued

|  | Example 1 | Example 2 | Example 3 |
|---|---|---|---|
| Hydrogen to oil at inlet(v/v) | 1000:1 | 1200:1 | 1500:1 |
| Volumetric space velocity, $h^{-1}$ | 2.5/10.0 | 1.6/15.0 | 3.0/12.0 |
| Average reaction temperature, ° C. | 380 | 375 | 360 |
| Ratio of first hydrocracked material flow A to wax oil, wt % | 20 | 45 | 35 |
| Hydrogenation isocracking reaction conditions | | | |
| Feedstock | D = 50:50 | D = 70:30 | D = 90:10 |
| Catalyst | FC-20/FF-56 | FC-20/FF-56 | FC-20/FF-56 |
| Reaction pressure, MPa | 12.0 | 17.0 | 15.0 |
| Hydrogen to oil at inlet(v/v) | 700:1 | 900:1 | 1300:1 |
| Volumetric space velocity, $h^{-1}$ | 1.5/10.0 | 1.6/15.0 | 6.0/12.0 |
| Average reaction temperature, ° C. | 325 | 335 | 350 |
| E, % | 100 | 50 | 20 |

In Table 2, "D" refers to weight ratio of first hydrocracked liquid-phase material flow to hydrocracked tail oil.

In Table 2, "E" refers to weight ratio of hydrocracked tail oil involved in hydrogenation isocracking to total hydrocracked tail oil.

The properties of the products obtained in the examples 1-3 are listed in Table 3.

TABLE 3

|  | Example 1 | Example 2 | Example 3 |
|---|---|---|---|
| Hydrocracked heavy naphtha product | | | |
| Sulfur content, µg/g | <0.5 | <0.5 | <0.5 |
| Aromatic potential content, m % | 57 | 56 | 61 |
| Hydrogenation isocracked heavy naphtha product | | | |
| Sulfur content, µg/g | <0.5 | <0.5 | <0.5 |
| Aromatic potential content, m % | 56 | 55 | 60 |
| Hydrocracked jet fuel product | | | |
| Freezing point, ° C. | <−60 | <−60 | <−60 |
| Smoke point, mm | 26 | 29 | 28 |
| Hydrogenation isocracked jet fuel product | | | |
| Freezing point, ° C. | <−60 | <−60 | <−60 |
| Smoke point, mm | 25 | 27 | 26 |
| Hydrocracked diesel oil product | | | |
| Sulfur content, µg/g | <5 | <5 | <5 |
| Solidifying point, ° C. | −20 | −21 | −22 |
| Cetane value | 60 | 65 | 64 |
| Hydrogenation isocracked diesel oil product | | | |
| Sulfur content, µg/g | <5 | <5 | <5 |
| Solidifying point, ° C. | −33 | −42 | −37 |
| Cetane value | 51 | 53 | 61 |
| Hydrocracked tail oil product | | | |
| Solidifying point, ° C. | 36 | 33 | 38 |
| BMCI value | 8.2 | 6.8 | 7.5 |

TABLE 3-continued

|  | Example 1 | Example 2 | Example 3 |
|---|---|---|---|
| Hydrogenation isocracked tail oil procuct | | | |
| Solidifying point, ° C. | −5 | −15 | −10 |
| BMCI value | 10.1 | 9.1 | 9.6 |
| Viscosity index | 137 | 131 | 140 |

EXAMPLES 4-6

The method and system described in the example 1 are used, but the gas-liquid separator 9 is excluded; specifically:

(1) As shown in FIG. 2, wax oil as feedstock and hydrogen are fed into a pre-hydrotreating reactor 1 that is provided with a pre-hydrotreating catalyst bed layer (charged with a hydroprocessing guard catalyst and a pre-hydrotreating catalyst) to have a reaction to obtain a pre-hydrotreated material flow; the pre-hydrotreating reaction conditions are listed in Table 4.

(2) The pre-hydrotreated material flow and hydrogen are fed into the hydrocracking reactor that is provided with a first hydrocracking unit 2 (a first hydrocracking catalyst bed layer) and a second hydrocracking unit 3 (a second hydrocracking catalyst bed layer), a first hydrocracked material flow is obtained after the pre-hydrotreated material flow and hydrogen pass through the first hydrocracking catalyst bed layer, and a part of the first hydrocracked material flow (first hydrocracked material flow A) is extracted, so that the first hydrocracked material flow is divided into a first hydrocracked material flow A and a first hydrocracked material flow B; the first hydrocracking reaction conditions are listed in Table 4.

The steps (3) and (4) are executed according to the example 1, wherein, the conditions of the reactions involved in those steps are listed in Table 4.

In the Table 4, the FZC series refers to a composite of 10 vol % FZC-100, 30 vol % FZC-105, and 60 vol % FZC-106.

TABLE 4

|  | Example 4 | Example 5 | Example 6 |
|---|---|---|---|
| Pre-hydrotreating conditions | | | |
| Feedstock | Wax oil 3 | Wax oil 3 | Wax oil 2 |
| Catalyst | FZC series/FF-56 | FZC series/FF-56 | FZC series/FF-56 |
| Volume ratio of catalyst | 10:90 | 10:90 | 15:85 |
| Reaction pressure, MPa | 12.0 | 17.0 | 15.0 |
| Hydrogen to oil at inlet(v/v) | 800:1 | 1000:1 | 1200:1 |
| Total volumetric space velocity, $h^{-1}$ | 1.0 | 0.8 | 1.2 |
| Average reaction temperature, ° C. | 380 | 375 | 365 |

TABLE 4-continued

|  | Example 4 | Example 5 | Example 6 |
|---|---|---|---|
| First hydrocracking reaction conditions ||||
| Feedstock | Pre-hydrotreated material flow |||
| Catalyst | FC-32 | FC-32 | FC-32 |
| Reaction pressure, MPa | 12.0 | 17.0 | 15.0 |
| hydrogen to oil at inlet(v/v) | 1000:1 | 1200:1 | 1500:1 |
| Volumetric space velocity, $h^{-1}$ | 2.5 | 1.6 | 3.6 |
| Average reaction temperature, °C | 380 | 375 | 365 |
| Second hydrocracking reaction conditions ||||
| Feedstock | First hydrocracked material flow B |||
| Catalyst | FC-32/FF-56 | FC-32/FF-56 | FC-32/FF-56 |
| Reaction pressure, MPa | 12.0 | 17.0 | 15.0 |
| hydrogen to oil at inlet(v/v) | 1000:1 | 1200:1 | 1500:1 |
| Volumetric space velocity, $h^{-1}$ | 2.5/10.0 | 1.6/15.0 | 3.6/12.0 |
| Average reaction temperature, °C | 380 | 375 | 365 |
| Ratio of first hydrocracked material flow A to wax oil, wt % | 20 | 45 | 35 |
| Hydrogenation isocracking reaction conditions ||||
| Feedstock | D = 50:50 | D = 70:30 | D = 90:10 |
| Catalyst | FC-20/FF-56 | FC-20/FF-56 | FC-20/FF-56 |
| Reaction pressure, MPa | 12.0 | 17.0 | 15.0 |
| hydrogen to oil at inlet(v/v) | 800:1 | 1000:1 | 1200:1 |
| Volumetric space velocity, $h^{-1}$ | 2.1/10.0 | 1.5/15.0 | 3.5/12.0 |
| Average reaction temperature, °C | 385 | 380 | 388 |
| E, % | 100 | 60 | 15 |

In Table 4, "D" refers to weight ratio of first hydrocracked material flow A to hydrocracked tail oil.

In Table 4, "E" refers to weight ratio of hydrocracked tail oil involved in hydrogenation isocracking to total hydrocracked tail oil.

The properties of the products obtained in the examples 4-6 are listed in Table 5.

TABLE 5

|  | Example 4 | Example 5 | Example 6 |
|---|---|---|---|
| Hydrocracked heavy naphtha product ||||
| Sulfur content, μg/g | <0.5 | <0.5 | <0.5 |
| Aromatic potential content, m % | 58 | 57 | 61 |
| Hydrogenation isocracked heavy naphtha product ||||
| Sulfur content, μg/g | <0.5 | <0.5 | <0.5 |
| Aromatic potential, m % | 55 | 55 | 59 |
| Hydrocracked jet fuel product ||||
| Freezing point, °C | <−60 | <−60 | <−60 |
| Smoke point, mm | 25 | 29 | 28 |
| Hydrogenation isocracked jet fuel product ||||
| Freezing point, °C | <−60 | <−60 | <−60 |
| Smoke point, mm | 24 | 26 | 26 |
| Hydrocracked diesel oil product ||||
| Sulfur content, μg/g | <5 | <5 | <5 |
| Solidifying point, °C | −20 | −21 | −22 |
| Cetane value | 60 | 65 | 64 |
| Hydrogenation isocracked diesel oil product ||||
| Sulfur content, μg/g | <5 | <5 | <5 |
| Solidifying point, °C | −30 | −35 | −38 |
| Cetane value | 50 | 59 | 60 |
| Hydrocracked tail oil product ||||
| Solidifying point, °C | 35 | 34 | 36 |
| BMCI value | 8.6 | 6.5 | 7.8 |
| Hydrogenation isocracked tail oil product ||||
| Solidifying point, °C | −5 | −5 | −10 |
| BMCI value | 10.0 | 9.1 | 9.6 |
| Viscosity index | 135 | 130 | 138 |

It is seen from the examples: with the hydrocracking method and system provided in the present invention, hydrocracked products with different properties can be produced, especially, high-quality lubricant base oil can be produced; and the production is flexible.

In the method provided in the present invention, a part of the first hydrocracked material flow is further hydrocracked to obtain jet fuel product, diesel oil product, and tail oil product that have high normal hydrocarbon content and low aromatic hydrocarbon content; the remaining part of the first hydrocracked material flow and at least a part of the hydrocracked tail oil product are hydrogenation isocracked when they pass through the hydrogenation isocracking catalyst, to obtain hydrogenation isocracked products with high isomeric hydrocarbon content, especially, the hydrogenation isocracked diesel oil product has a low solidifying point, and the tail oil product has a low solidifying point and a high viscosity index; in addition, through further hydrogenation isocracking of the hydrocracked tail oil product, the isoalkane content in the hydrogenation isocracked tail oil product can be increased, the aromatic hydrocarbon content and the polycyclic naphthene content in the hydrogenation isocracked tail oil product can be decreased, and the viscosity index of the hydrogenation isocracked tail oil product can be further increased.

In the present invention, preferably the first hydrocracked material flow A is separated by gas-liquid separation to obtain a first hydrocracked gas-phase material flow and a first hydrocracked liquid-phase material flow, and then the first hydrocracked gas-phase material flow is introduced into the step (3) to have the second hydrocracking reaction; controlling the first hydrocracked liquid-phase material flow, at least a part of the hydrocracked tail oil product and a hydrogen-containing material flow to contact with the hydrogenation isocracking catalyst in the step (4) to carry out the hydrogenation isocracking reaction; thus, the inhibiting effect of $H_2S$ and $NH_3$ on the hydrogenation isocracking catalyst is reduced, and thereby the reactivity of the hydrogenation isocracking catalyst is improved, i.e., the reaction temperature required to attain the same reaction effect is decreased; hence, the temperature of the hydrogenation isocracking reaction in the examples 1-3 of the present invention is obviously lower than the temperature of the hydrogenation isocracking reaction in the examples 4-6 of the present invention.

While the present invention is described above in detail in some preferred embodiments with reference to the accompanying drawings, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A wax oil hydrocracking method, comprising:
(1) contacting wax oil and a hydrogen-containing material flow with a pre-hydrotreating catalyst under pre-hydrotreating conditions to obtain a pre-hydrotreated material flow;
(2) contacting the pre-hydrotreated material flow and a hydrogen-containing material flow with a first hydrocracking catalyst to perform a first hydrocracking reaction under first hydrocracking conditions to obtain a first hydrocracked material flow, and dividing the first hydrocracked material flow into flow A and flow B;
(3) contacting flow B and a hydrogen-containing material flow with a second hydrocracking catalyst to perform a second hydrocracking reaction under second hydrocracking conditions to obtain a second hydrocracked material flow, and then separating and fractionating the second hydrocracked material flow to obtain a hydrocracked tail oil product; and
(4) contacting flow A, at least a part of the hydrocracked tail oil product, and a hydrogen-containing material flow with a hydrogenation isocracking catalyst to perform a hydrogenation isocracking reaction under hydrogenation isocracking conditions to obtain a hydrogenation isocracked material flow, and then separating and fractionating the hydrogenation isocracked material flow.

2. The method according to claim 1, wherein flow A accounts for 5-95 wt % of the wax oil.

3. The method according to claim 2, wherein flow A accounts for 10-80 wt % of the wax oil.

4. The method according to claim 1, wherein the method further comprising: separating flow A by gas-liquid separation to obtain a first hydrocracked gas-phase material flow and a first hydrocracked liquid-phase material flow; introducing the first hydrocracked gas-phase material flow into the step (3) to carry out the second hydrocracking reaction; contacting the first hydrocracked liquid-phase material flow, at least a part of the hydrocracked tail oil product and the hydrogen-containing material flow with the hydrogenation isocracking catalyst in the step (4) to carry out the hydrogenation isocracking reaction; the first hydrocracked liquid-phase material flow accounts for 5-95 wt % of the wax oil.

5. The method according to claim 4, wherein the first hydrocracked liquid-phase material flow accounts for 10-80 wt % of the wax oil.

6. The method according to claim 1, wherein a hydrocracked hydrogen-rich gas, a hydrocracked gas product, a hydrocracked naphtha product, a hydrocracked jet fuel product, a hydrocracked diesel oil product, and the hydrocracked tail oil product are obtained through the separation and fractionation in the step (3);
a hydrogenation isocracked hydrogen-rich gas, a hydrogenation isocracked gas product, a hydrogenation isocracked naphtha product, a hydrogenation isocracked jet fuel product, a hydrogenation isocracked diesel oil product, and a hydrogenation isocracked tail oil product are obtained through the separation and fractionation in the step (4).

7. The method according to claim 6, wherein the separation in the step (3) comprises high-pressure separation and low-pressure separation, the second hydrocracked material flow is separated by high-pressure separation to obtain a hydrocracked hydrogen-rich gas and a hydrocracked high-pressure separated liquid-phase material flow, then the hydrocracked high-pressure separated liquid-phase material flow is separated by low-pressure separation to obtain a hydrocracked gas product and a hydrocracked liquid-phase material flow, the hydrocracked liquid-phase material flow is fractionated to obtain a hydrocracked naphtha product, a hydrocracked jet fuel product, a hydrocracked diesel oil product, and the hydrocracked tail oil product;
the separation in the step (4) comprises high-pressure separation and low-pressure separation, the hydrogenation isocracked material flow is separated by high-pressure separation to obtain a hydrogenation isocracked hydrogen-rich gas and a hydrogenation isocracked high-pressure separated liquid-phase material flow, and then the hydrogenation isocracked high-pressure separated liquid-phase material flow is separated by low-pressure separation to obtain a hydrogenation isocracked gas product and a hydrogenation isocracked liquid-phase material flow, the hydrogenation isocracked liquid-phase material flow is fractionated to obtain a hydrogenation isocracked naphtha product, a hydrogenation isocracked jet fuel product, a hydrogenation isocracked diesel oil product, and a hydrogenation isocracked tail oil product;
the method further comprises: recycling the hydrocracked hydrogen-rich gas and the hydrogenation isocracked hydrogen-rich gas to provide required hydrogen-containing material flow.

8. The method according to claim 1, wherein an initial boiling point of the wax oil is 100-400° C., and a final boiling point of the wax oil is 405-650° C.;
the wax oil is selected from at least one of vacuum gas oil (VGO), coker gas oil (CGO), deasphalted oil (DAO), catalytic cycle oil, coal tar, direct coal liquefaction distillate (DCLD), indirect coal liquefaction distillate (ICLD), synthetic oil, and shale oil;
wherein an initial boiling point of the hydrocracked tail oil product is 300-375° C.

9. The method according to claim 1, wherein the pre-hydrotreating catalyst contains a carrier and an active component, wherein, the active component is one or more VIB metal, one or more VIII metal, or mixtures thereof, and the carrier is alumina, silicon-containing alumina, or a mixture thereof;
   wherein, based on the total weight of the pre-hydrotreating catalyst and measured in oxide, a content of the VIB metal element is 10-35 wt %, and a content of the VIII metal element is 3-15 wt %;
   a specific surface area of the pre-hydrotreating catalyst is 100-650 m$^2$/g, and a pore volume of the pre-hydrotreating catalyst is 0.15-0.6 mL/g.

10. The method according to claim 1, wherein the pre-hydrotreating conditions include: reaction pressure: 3-19 MPa, reaction temperature: 300-450° C., liquid hourly space velocity: 0.2-6 h$^{-1}$, and volume ratio of hydrogen to oil: 100-2,000:1.

11. The method according to claim 1, wherein the first hydrocracking catalyst and the second hydrocracking catalyst respectively and independently contain a carrier and an active constituent, wherein, the active constituent is one or more VIB metal, one or more VIII metal, or mixtures thereof, and the carrier contains a Y zeolite;
   based on a total weight of the first hydrocracking catalyst and measured in oxide, a content of the VIB metal is 10-35 wt %, and a content of the VIII metal is 3-15 wt %;
   the content of the Y zeolite is 5-80 wt %;
   based on a total weight of the second hydrocracking catalyst and measured in oxide, a content of the VIB metal is 10-35 wt %, and a content of the VIII metal is 3-15 wt %; and a content of the Y zeolite is 5-80 wt %.

12. The method according to claim 1, wherein the first hydrocracking conditions and the second hydrocracking conditions respectively and independently include: reaction pressure: a pressure of 3-19 MPa, a reaction temperature of 300-450° C., a liquid hourly space velocity of 0.2-6 h$^{-1}$, and a volume ratio of hydrogen to oil is 100to 2,000.

13. The method according to claim 1, wherein the hydrocracked tail oil product in the step (4) accounts for 10-100 wt % of the hydrocracked tail oil product obtained in the step (3).

14. The method according to claim 1, wherein the hydrogenation isocracking catalyst contains a carrier and an active constituent, wherein, the active constituent is one or more of VIB metal, one or more of VIII metal, or mixtures thereof, and the carrier comprises a beta zeolite, a SAPO zeolite, or both; and
   based on a total weight of the hydrogenation isocracking catalyst and measured in oxide, a content of the VIB metal is 10-35 wt %, a content of the VIII metal is 3-15 wt %, and a content of the beta zeolite, the SAPO zeolite, or the mixture thereof is 5-80 wt %.

15. The method according to claim 1, wherein the hydrogenation isocracking conditions include a reaction pressure of 3-19 MPa, a reaction temperature of 300-450° C., a liquid hourly space velocity of 0.2-6 h$^{-1}$, and a volume ratio of hydrogen to oil of 100-2,000.

16. A wax oil hydrocracking system, comprising:
   a pre-hydrotreating unit;
   a first hydrocracking unit, in which a pre-hydrotreated material flow obtained from the pre-hydrotreating unit is treated by a first hydrocracking to obtain a first hydrocracked material flow;
   a second hydrocracking unit, in which a part of the first hydrocracked material flow is treated by a second hydrocracking to obtain a second hydrocracked material flow;
   a hydrocracking separation unit, in which the second hydrocracked material flow is separated to obtain a hydrocracked hydrogen-rich gas, a hydrocracked gas product, and a hydrocracked liquid-phase material flow;
   a hydrocracking fractionation tower, in which the hydrocracked liquid-phase material flow is fractionated to obtain a hydrocracked tail oil product;
   a hydrogenation isocracking reactor, in which a portion of the first hydrocracked material flow and at least a portion of the hydrocracked tail oil product are treated by hydrogenation isocracking to obtain a hydrogenation isocracked material flow;
   a hydrogenation isocracking separation unit, in which the hydrogenation isocracked material flow is separated to obtain a hydrogenation isocracked hydrogen-rich gas, a hydrogenation isocracked gas product, and a hydrogenation isocracked liquid-phase material flow; and
   a hydrogenation isocracking fractionation tower, in which the hydrogenation isocracked liquid-phase material flow is fractionated.

17. The system according to claim 16, further comprising: a gas-liquid separator configured to perform gas-liquid separation of the portion of the first hydrocracked material flow to obtain a first hydrocracked gas-phase material flow and a first hydrocracked liquid-phase material flow, the first hydrocracked gas-phase material flow is fed into the second hydrocracking unit, and the first hydrocracked liquid-phase material flow is fed into the hydrogenation isocracking reactor.

18. The system according to claim 16, wherein the hydrocracking separation unit comprises a hydrocracking high-pressure separator and a hydrocracking low-pressure separator that are connected in series, the second hydrocracked material flow is separated in the hydrocracking high-pressure separator to obtain a hydrocracked hydrogen-rich gas and a hydrocracked high-pressure separated liquid-phase material flow; the hydrocracked high-pressure separated liquid-phase material flow is separated in the hydrocracking low-pressure separator to obtain a hydrocracked gas product and the hydrocracked liquid-phase material flow;
   the hydrogenation isocracking separation unit comprises a hydrogenation isocracking high-pressure separator and a hydrogenation isocracking low-pressure separator, the hydrogenation isocracked material flow is separated in the hydrogenation isocracking high-pressure separator to obtain a hydrogenation isocracked hydrogen-rich gas and a hydrogenation isocracked high-pressure separated liquid-phase material flow; the hydrogenation isocracked high-pressure separated liquid-phase material flow is separated in the hydrogenation isocracking low-pressure separator to obtain a hydrogenation isocracked gas product and the hydrogenation isocracked liquid-phase material flow.

19. The system according to claim 18, wherein the gas phase outlet of the hydrocracking high-pressure separator and the gas phase outlet of the hydrogenation isocracking high-pressure separator respectively and independently communicate with at least one of the inlet of the pre-hydrotreating unit, an inlet of the first hydrocracking unit, an the inlet of the second hydrocracking unit, and an inlet of the hydrogenation isocracking reactor, to recycle the hydrocracked hydrogen-rich gas and the hydrogenation isocracked hydrogen-rich gas so as to provide a hydrogen-containing material flow required for the system.

20. The system according to claim 16, wherein the pre-hydrotreating unit, the first hydrocracking unit, and the second hydrocracking unit are arranged in one hydrogenation reactor; or the pre-hydrotreating unit, the first hydrocracking unit, and the second hydrocracking unit are respectively arranged in different hydrogenation reactors; or the pre-hydrotreating unit is arranged in one hydrogenation reactor, and the first hydrocracking unit and the second hydrocracking unit are arranged in another hydrogenation reactor.

* * * * *